Patented Dec. 6, 1938

2,139,471

UNITED STATES PATENT OFFICE 2,139,471

METAL AZOMETHINE COMPOUNDS

Karl Schmidt, Cologne-Muhlheim, Germany, assignor to General Aniline Works, Inc., New York, N. Y., a corporation of Delaware No Drawing. Application July 28, 1937, Serial No. 156,141. In Germany August 6, 1936

7 Claims. (Cl. 260—11)

The present invention relates to new water-insoluble dyestuffs, more particularly it relates to metal compounds of azomethine compounds of the general formula:

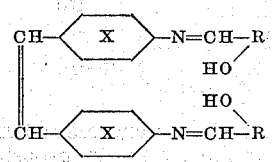

in which R means an arylene radical in which the hydroxyl group stands in o-position to the azomethine group and at least one of the benzene nuclei designated by X contains a sulfonic acid group.

My new metal containing dyestuffs are obtainable by condensing diaminostilbene sulfonic acids with aromatic o-hydroxy-aldehydes and converting the products thus obtained into metal compounds by treating them with watersoluble metal salts.

As suitable aldehydes for the purpose of the present invention may be mentioned by way of example o-hydroxybenzaldehyde, 2-hydroxy-1-naphthaldehyde, 1-hydroxy-2-naphthaldehyde, carbazole-o-hydroxyaldehyde and anthracene-o-hydroxyaldehyde.

It is understood that these carbonyl compounds may bear in the nucleus or nuclei respectively further substituents, such as the hydroxy group, halogen, alkyl, alkoxy, the nitro group, the amino group, a substituted amino group, the carboxyl group. As watersoluble metal salts which are used to convert the condensation products into metal compounds may be mentioned by way of example the salts of the alkaline earth metals and the heavy metals, such as the salts of calcium, barium, iron, nickel, cobalt, manganese, copper, zinc, chromium, aluminium, cadmium, lead, titanium, zirconium, thorium and so on.

The compounds obtained with zinc, nickel and cobalt have proved to be particularly suitable. Very good results are further obtained with chromium and copper.

The preferred form of preparing the new metal containing compounds is by dissolving the alkali metal salt of a diamino-stilbene sulfonic acid and an aromatic o-hydroxy-aldehyde in a water-alcohol mixture, and adding thereto an aqueous alcoholic solution of a metal salt, the reaction being preferably performed at elevated temperature; however, the reaction may also be carried out at lower temperature, for instance at room temperature. The precipitation of the metal compound begins almost immediately and becomes complete very quickly.

The products obtained represent corresponding to the specific compounds used in their manufacture, variously colored substances. They are waterinsoluble dyestuffs which are distinguished by good fastness to oil, spirit and solvents and exhibit a remarkable fastness to light; they can be used for color lakes.

The following examples illustrate the invention without being restricted thereto, the parts being by weight.

Example 1

10.5 parts of the sodium salt of diaminostilbene disulfonic acid and 8.6 parts of 2-hydroxy-1-naphthaldehyde are dissolved in 375 parts of 50% alcohol at about 75° C. On adding a hot solution of 18.3 parts of zinc acetate in 190 parts of 50% alcohol, there separates a red precipitate. The reaction mixture is heated for 2 hours at 75–80° C. The red precipitate is filtered with suction, washed with 200 parts of 50% alcohol and dried at 60–70° C. There are obtained 20 parts of a dark red powder, which is the zinc compound of the condensation product of the following formula:

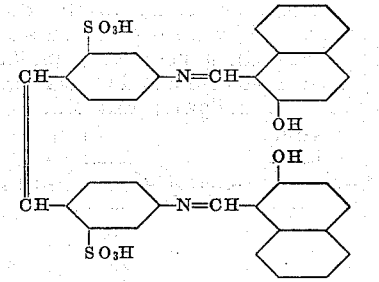

The graphic print which is obtained with the red dyestuff shows a remarkable fastness to light, solvents and spirit.

Example 2

10.5 parts of the sodium salt of diaminostilbene disulfonic acid and 8.6 parts of 2-hydroxy-1- naphthaldehyde are dissolved in 375 parts of 50% alcohol at about 75° C. and, while stirring, there is added thereto a solution of 23.6 parts of nickelous chloride in 280 parts of 50% alcohol. Thereby a light-red precipitate separates which, after heating for one hour, is filtered with suction at 75° C. washed with dilute alcohol and dried at 60–70° C. There are obtained 20 parts of a light-red colored powder, which is the nickel compound of the condensation product of the same formula as stated in Example 1.

The graphic print shows a pure yellowish-red shade. The dyestuff is distinguished by a good fastness to oil, spirit and solvents.

*Example 3*

On substituting the nickelous chloride, used in Example 2, by the equivalent quantity of cobaltous chloride, and otherwise working according to the directions given in Example 2, there is obtained a dyestuff of similar shades and of the same good fastness properties.

*Example 4*

10.5 parts of the sodium salt of diaminostilbene disulfonic acid and 7.8 parts of 5-chloro-2-hydroxybenzaldehyde are dissolved in 280 parts of 50% alcohol at about 75° C. While stirring a hot solution of 18.3 parts of zinc acetate in 200 parts of 50% alcohol is introduced. The reaction mixture is then heated for one hour at about 75° C. and thereupon allowed to cool slowly. At 65° C. there separates a rather large quantity of an orange colored precipitate. After cooling this is filtered with suction, washed with 50% alcohol and dried at 60–70° C. Thus there are obtained 17.3 parts of an intensely colored orange powder, which is the zinc compound of the condensation product of the following formula:

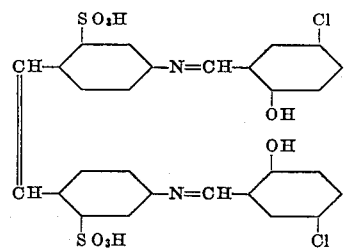

The print which is obtained with this dyestuff is distinguished by good fastness to spirit.

*Example 5*

On substituting in Example 4 the 5-chloro-2-hydroxybenzaldehyde by the equivalent quantity of 4.5-dimethyl-2-hydroxy-benzaldehyde, and otherwise working according to the directions given in Example 4, there is obtained a dyestuff of a more reddish shade possessing similar properties. It is the zinc compound of the condensation product of the following formula:

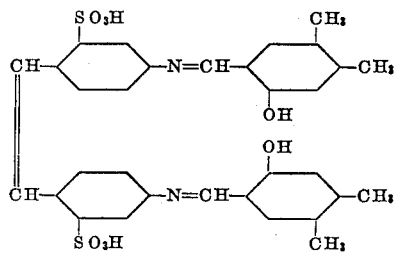

*Example 6*

10.5 parts of the sodium salt of diaminostilbene disulfonic acid and 8.6 parts of 2-hydroxyl-naphthaldehyde are dissolved in 400 parts of 50% alcohol at about 70° C. On adding 18.7 parts of chromium acetate in 250 parts of 50% alcohol—while stirring—there separates a reddish-brown precipitate. The reaction mixture is heated for 2 hours at 70° C. The product obtained is the chromium compound of the condensation product of the following formula:

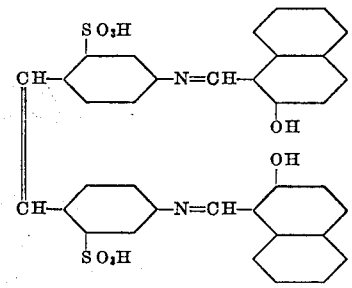

The graphic print shows a full red of a good fastness to oil, spirit and solvents.

I claim:

1. As new products the metal compounds of compounds of the following general formula:

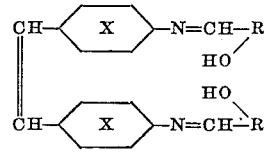

wherein R stands for an arylene radical, in which the hydroxyl group stands in o-position to the azomethine group and at least one of the benzene nuclei designated by X contains a sulfonic acid group.

2. As new products the compounds of metals selected from the group consisting of zinc, nickel and cobalt with azomethine compounds of the following general formula:

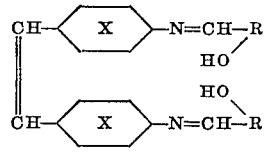

wherein R stands for an arylene radical, in which the hydroxyl group stands in o-position to the azomethine group and at least one of the benzene nuclei designated by X contains a sulfonic acid group.

3. As new products the metal compounds of compounds of the following general formula:

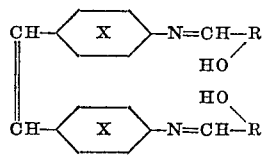

wherein R stands for an aromatic radical selected from the group consisting of the naphthylene and phenylene radicals, in which the hydroxyl group stands in o-position to the azomethine group and at least one of the benzene nuclei designated by X contains a sulfonic acid group.

4. As new products the compounds of metals selected from the group consisting of zinc, nickel and cobalt with azomethine compounds of the following general formula:

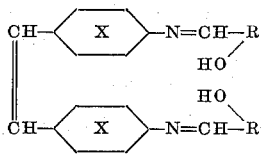

wherein R stands for an aromatic radical selected from the group consisting of the naphthylene and phenylene radicals, in which the hydroxyl group stands in o-position to the azomethine group and at least one of the benzene nuclei designated by X contains a sulfonic acid group.

5. The zinc compound of a compound of the following formula:

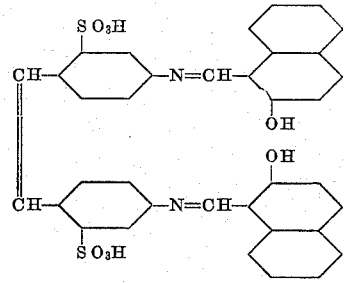

being a dark red pigment of good fastness to light, spirit and solvents.

6. The zinc compound of a compound of the following formula:

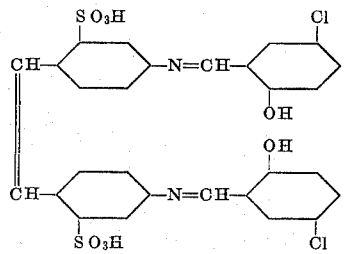

being an orange colored pigment of good fastness to light, spirit and solvents.

7. The zinc compound of a compound of the following formula:

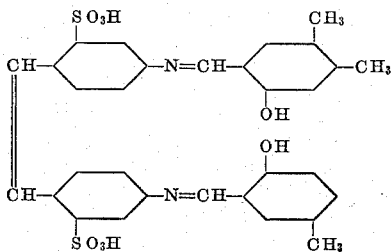

being a reddish-orange pigment of good fastness to light, spirit and solvents.

KARL SCHMIDT.